(12) United States Patent
Rigstad et al.

(10) Patent No.: US 7,624,434 B2
(45) Date of Patent: Nov. 24, 2009

(54) SYSTEM FOR PROVIDING FIREWALL CAPABILITIES TO A COMMUNICATION DEVICE

(75) Inventors: Peter M. Rigstad, Holladay, UT (US); John Y. Yoon, Salt Lake City, UT (US); Mark Farahar, Les Granges le Roi (FR); Barani Subbiah, Sunnyvale, CA (US); Brant D. Thomsen, Sandy, UT (US); David E. Richmond, Kearns, UT (US); Vered Maor Semel, Palo Alto, CA (US); Earl Bryner, Clinton, UT (US)

(73) Assignee: 3Com Corporation, Marlborough, MA (US)

( * ) Notice: Subject to any disclaimer, the term of this patent is extended or adjusted under 35 U.S.C. 154(b) by 552 days.

(21) Appl. No.: 10/090,543

(22) Filed: Mar. 1, 2002

(65) Prior Publication Data

US 2003/0167410 A1     Sep. 4, 2003

(51) Int. Cl.
G06F 17/00     (2006.01)
G06F 7/04      (2006.01)
G06F 15/173    (2006.01)
G06F 15/16     (2006.01)
H04L 9/00      (2006.01)

(52) U.S. Cl. .............................. 726/11; 726/4; 713/168; 713/181; 709/225; 709/228

(58) Field of Classification Search ................ 713/200, 713/201; 709/220, 225
See application file for complete search history.

(56) References Cited

U.S. PATENT DOCUMENTS

| | | | | |
|---|---|---|---|---|
| 4,823,345 A * | 4/1989 | Daniel et al. | ................... | 371/37 |
| 5,278,904 A * | 1/1994 | Servi | .......................... | 380/23 |
| 5,475,826 A * | 12/1995 | Fischer | ................... | 395/182.04 |
| 5,475,839 A * | 12/1995 | Watson et al. | ............... | 395/650 |
| 5,826,014 A * | 10/1998 | Coley et al. | ............ | 395/187.01 |
| 5,826,048 A * | 10/1998 | Dempsey et al. | ............ | 395/309 |
| 5,968,176 A * | 10/1999 | Nessett et al. | ............... | 713/201 |
| 6,167,052 A * | 12/2000 | McNeill et al. | ............. | 370/399 |
| 6,243,815 B1 * | 6/2001 | Antur et al. | .................. | 713/201 |
| 6,272,169 B1 * | 8/2001 | Boswell et al. | ............. | 375/222 |
| 6,324,656 B1 * | 11/2001 | Gleichauf et al. | ............. | 714/37 |
| 6,385,195 B2 * | 5/2002 | Sicher et al. | ................ | 370/356 |
| 6,389,419 B1 * | 5/2002 | Wong et al. | .................... | 707/7 |
| 6,496,840 B1 * | 12/2002 | Uceda-Sosa | ................ | 707/204 |
| 6,550,012 B1 * | 4/2003 | Villa et al. | .................... | 726/11 |
| 6,662,221 B1 * | 12/2003 | Gonda et al. | ................ | 709/223 |

(Continued)

OTHER PUBLICATIONS

Anonymous, Microsoft Computer Dictionary, 2002, Microsoft Press, Fifth Edition, pp. 342, 403.*

(Continued)

*Primary Examiner*—William R Korzuch
*Assistant Examiner*—Aravind K Moorthy (57) ABSTRACT

A system for providing security in a computing network. The system has a server for distributing policies to be implemented by firewall devices in the network. The firewall devices provide hardware implemented firewalls to communication devices making network connections. The system has logic to allow a connection to be made to the network via a communication device at a node provided the firewall device is at that node. Therefore, the firewall device must be in the system for a connection to be established via the communication device. Additionally, the system is configured to cause data transferred by the communication device to be processed by the firewall.

14 Claims, 11 Drawing Sheets

U.S. PATENT DOCUMENTS

| | | | |
|---|---|---|---|
| 6,681,243 B1 * | 1/2004 | Putzolu et al. | 709/202 |
| 6,996,614 B2 * | 2/2006 | Hallinan et al. | 709/226 |
| 7,003,562 B2 * | 2/2006 | Mayer | 709/223 |
| 7,058,811 B2 * | 6/2006 | Spain et al. | 713/176 |
| 2002/0010800 A1 | 1/2002 | Riley et al. | |
| 2003/0009677 A1 * | 1/2003 | Strongin et al. | 713/189 |

OTHER PUBLICATIONS

Newton, Harry, Newton's Telecom Dictionary, 2002, CMP Books, 18th Edition, p. 665.*

Author unknown; "A Remote System Policy Enforcer for Corporate Networks"; date unknown, 3 pgs.

* cited by examiner

FIG. 10

SYSTEM FOR PROVIDING FIREWALL CAPABILITIES TO A COMMUNICATION DEVICE

RELATED APPLICATION

The following U.S. Patent is herein incorporated by reference as background material: U.S. Pat. No. 5,968,176, issued Oct. 19, 1999, entitled "MULTILAYER FIREWALL SYSTEM" to Nessett et al.

TECHNICAL FIELD

The present invention generally pertains to the field of data networking. More particularly, the present invention is related to a system for providing a hardware firewall for a device without such a firewall in a network where it is desirable that devices have such a firewall.

BACKGROUND ART

When providing security for a network, one traditional method is a firewall at the perimeter at the network. However, it is desirable to allow authorized users to connect to the network remotely. For example, a corporation may wish to allow its employees to connect to a corporate network from home. While a perimeter firewall provides protection to the network from unauthorized access from remote devices, it may not be effective to protect against a security breach originating from an authorized device. For example, an employee may present a security risk due to his home computer being compromised.

One conventional method of providing security for a network is via software implemented firewalls. While software firewalls may be implemented on the devices that are physically remote from the network, the software firewalls are susceptible to attacks from Trojan programs and other hacking methods. For example, the data may flow from a communication device providing the network interface to a host device's operating system software stack where the software firewall performs its rule checks to determine whether the data should proceed further up the software stack. (And for outbound data the software firewall again resides at a point well above the network interface.) Numerous examples have been reported in which such software firewalls have been compromised.

Thus, while a corporation may desire that its employees are able to access portions of the corporate network from home or elsewhere outside the office, this presents significant security concerns. Even if the corporation provides its employees with a software firewall for their home computers, an employee's computer may be compromised without the employee's knowledge by a Trojan program, for example. Furthermore, when the employee logs into the corporate network, the perimeter firewall inside the corporate network provides little security.

Other conventional methods provide for a hardware implemented firewall by implementing a firewall on a network interface card (NIC). The corporation may then provide each employee with such a NIC. So long as the employees use these NICs, the network may be protected better than with software firewalls. However, many individuals already have legacy NICs without such firewalls. If the employee uses such a legacy NIC to connect to the corporate network, corporate network security may be compromised as the employee's computer is left unprotected.

Thus, a need has arisen for a way to prevent unauthorized access to a network. A still further need exists for a method that provides protection for a network that has devices making remote or local connections. An even further method is needed to provide protection that is not easily defeated by hacking techniques such as Trojan programs.

SUMMARY

Embodiments of the present invention provide a way to prevent unauthorized access to a network. Embodiments provide protection for a network that has devices making remote and local connections. Embodiments provide protection that is not easily defeated by hacking techniques such as Trojan programs.

A method, system, and device for providing security in a computing network are disclosed. One embodiment provides for a system having a server for distributing policies to be implemented by firewall devices in the network. The firewall devices provide hardware implemented firewalls to communication devices making network connections. The system has logic to allow a connection to be made to the network via a communication device at a node provided the firewall device is at that node. Therefore, the firewall device must be in the system for a connection to be established via the communication device. Additionally, the system is configured to cause data transferred by the communication device to be processed by the firewall.

These and other advantages of the present invention will no doubt become obvious to those of ordinary skill in the art after having read the following detailed description of the preferred embodiments which are illustrated in the various drawing figures.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications, and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, etc., is conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proved convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "measuring", "calculating", "receiving", "computing" or the like, refer to the actions and processes of a computer system, or similar electronic computing device. The computer system or similar electronic computing device manipulates and transforms data represented as physical (electronic) quantities within the computer system's registers and memories into other data similarly represented as physical quantities within the computer system memories or registers or other such information storage, transmission, or display devices. The present invention is also well suited to the use of other computer systems such as, for example, optical and mechanical computers.

Figure 1:
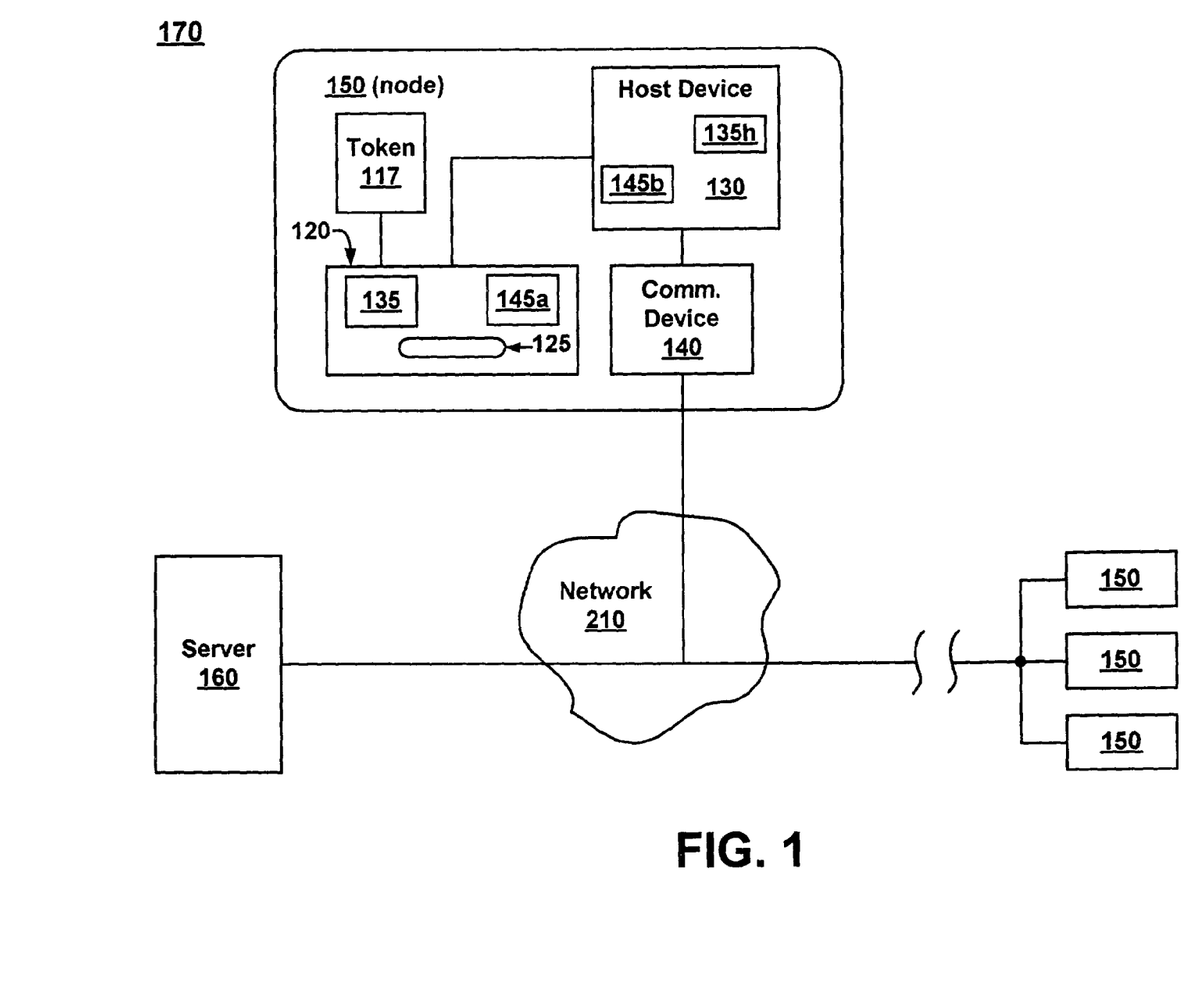
FIG. 1 is a diagram of a system with a device having an embedded firewall coupled to a host device, according to embodiments of the present invention.

Embodiments provide for a system that may be centrally managed and may have nodes with devices having hardware implemented firewalls. Referring now to FIG. 1, a node 150 has a first device 120 (e.g., a firewall device 120) having a hardware implemented firewall 125. The first device 120 is coupled to a host device 130 (e.g., personal computer, laptop, personal digital assistant, etc.). The firewall device 120 may be implemented on a device such as a PCMCIA card, although the present invention is not limited to such a card. The host device 130 may be coupled to a second device 140, such as a network interface card (NIC), which provides a physical communication interface to a network 210. The second device 140 may be a communications device without a hardware firewall. Throughout this application, second device 140 may be referred to as a communication interface device or communication device 140. The communication interface device 140 may connect to a server 160 via Ethernet. However, the present invention is not limited to Ethernet. As the system 170 does not require the server 160, the node 150 may also be referred to as a system 170.

Still referring to FIG. 1, the firewall device 120 has logic 135 to allow the node 150 to establish a connection to the network 210 via the communication interface device 140. For example, the firewall device 120 may implement hardware token authentication. Alternatively, the firewall device 120 may connect to another device, such as a token 117. The firewall device 120 also may have a configuration integrity checker 145a for checking integrity of software components in said system. A portion of the configuration integrity checker 145b may reside on the host device 130.

The system 170 also has a server 160 that may store policies to be transferred to nodes 150 and implemented by a firewall device 120 at a node 150. This server 160 may be referred to as a policy server 160. It will be understood that the policy server 160 is not required; for example, the firewall device 120 may store policies.

Furthermore, the node 150 is configured to cause data transferred by the communication interface device 140 to be processed by the firewall 125. For example, any data that is received by the communication interface device 140 is processed by the firewall 125 and any data that is to be sent to the network 210 via the communication interface device 140 is also processed by the firewall 125. In either case, the firewall 125 processing may occur either before or after the communication interface device 140 has the data. Embodiments described herein provide for suitable techniques for having all data transferred by the communication interface device 140 to be processed by the firewall 125. However, the present invention is not limited to the described embodiments.

Figure 2:
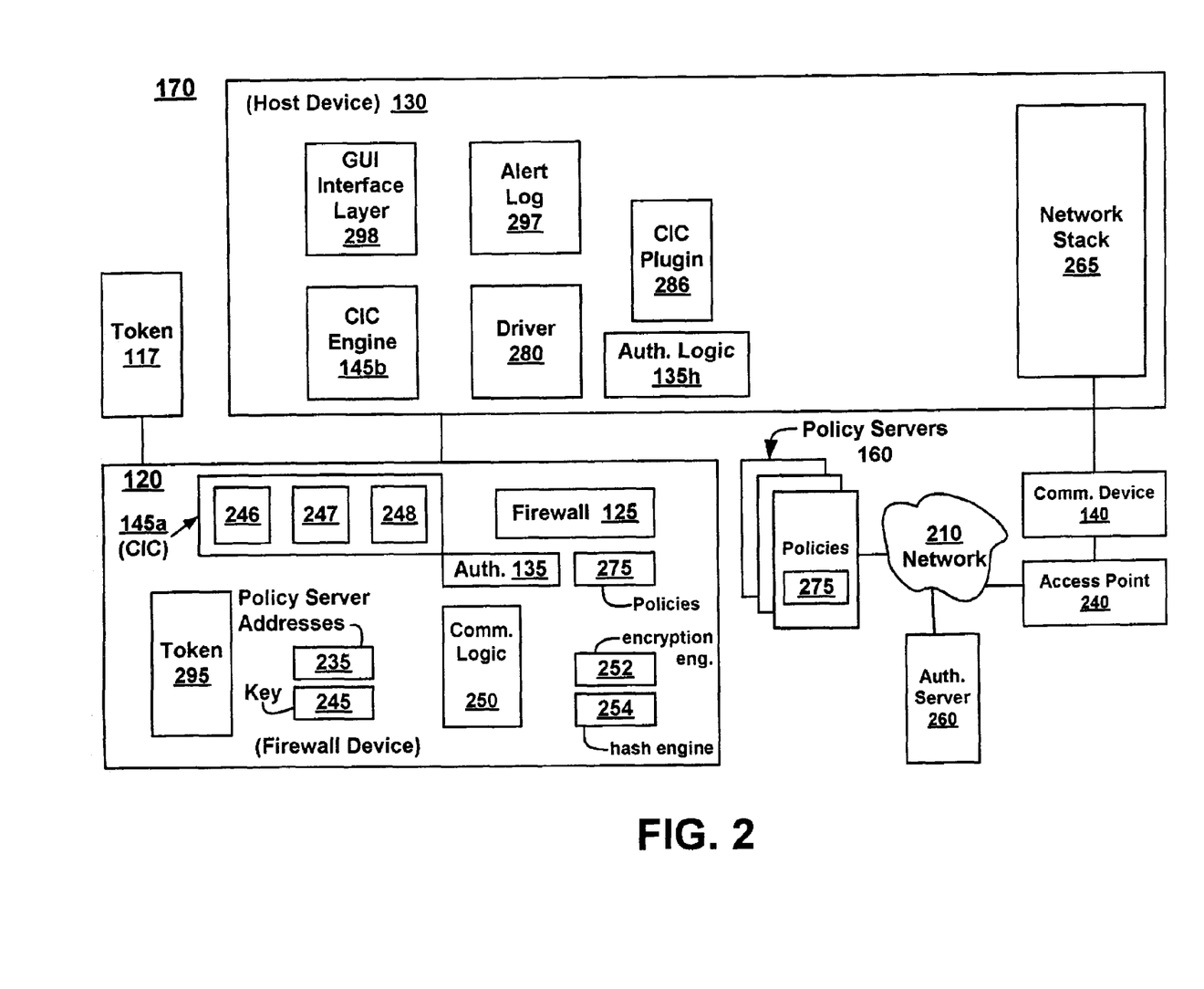
FIG. 2 is a diagram showing further details of a system with a device having an embedded firewall coupled to a host device, according to embodiments of the present invention.

Embodiments provide additional features to the system 170, as shown in FIG. 2. The firewall device 120 may store one or more addresses 235 of policy servers 160, which the firewall device 120 may try to find when it comes up. The policy servers 160 may be administered by an administrator console (not shown) that defines the firewall rules. Thus, the firewall device 120 may store policies 275 consisting of various rules defining: protocols it accepts or rejects, types of IP (Internet Protocol) addresses to which it is allowed to talk, etc. The administrator console may define these rules and provide them to a policy server 160, which gives them securely to the firewall device 120.

The firewall device 120 may receive updates to the policies 275 from the policy server 160. If the firewall device 120 cannot find a policy server 160, then the firewall device 120 may rely on fallback policies 275 that are stored on the firewall device 120 and/or another device, such as, for example a token 117. Multiple fallback policies 275 may be stored for one or more users. The firewall device 120 has stored therein rules which are used to determine which policies 275 to use depending on the type of communication the communication interface device is using and/or location. In one embodiment, the policy servers 160 are not used. Instead the host device 130 may be used as an administrator.

The transmissions between the firewall device 120 and the policy server 160 may be encrypted to provide additional security. The firewall device 120 may store a key, certificate, or the like 245, which is used to encrypt/decrypt the data that is transferred. Thus, the firewall device 120 is also shown with policy server communication logic 250, an encryption engine 252, and a cryptographic hash engine 254. The data that passes through the host device 130 network stack 265 to or from the communication interface device 140 may be encrypted and may not be decrypted by anything other than the firewall device 120. Throughout this application the term transfer security logic may be used to describe the components to provide additional security to the system by encrypting network transfers.

In order to provide additional security, embodiments provide for various logic to perform configuration integrity checking, which may be used to check if various software components in the system (e.g., in the host device 130) have been compromised. For example, embodiments may check the integrity of software drivers (e.g., firewall device driver 280 or drivers in the network stack 265) that are used to route data to the hardware firewall 125. In one embodiment, the check is performed on all registered software components. A portion of this logic may reside on the host device 130. For example, the host device 130 is shown having a configuration integrity checker validation plugin 286 and a configuration integrity checker engine 145b. Portions of this logic may reside on the firewall device 120. The firewall device 120 may have a configuration integrity checker (CIC) 145a comprising CIC engine validation logic 246, CIC component validation logic 247, and hardware driver validation logic 248. The CIC 145a may examine memory of CIC engine 145b and low level drivers (e.g., 280) and perform a cryptographic hash of those drivers by reading the memory contents directly out of the host device 130 O/S memory space and onto the firewall device 120 and then compare them against a stored cryptographic hash value on the firewall device 120. The stored cryptographic hash value may be distributed by a policy server 160 and potentially stored on the firewall device 120.

Still referring to FIG. 2, the system also comprises logic 135 (e.g., authentication logic) that allows a connection to be made to the network 210 provided the firewall device 120 is in the system. Without this logic 135, an attempt to connect to the network 210 will be refused. An authentication server 260 may be used to configure and enforce authentication. In this fashion, the communication interface device 140 is prevented from establishing a connection to the network 210 unless the firewall device 120 is coupled to the host device 130. For example, the firewall device 120 may implement hardware token 295 authentication. Alternatively, the firewall device 120 may connect to another device which is a token 117. Authentication logic 135 may reside entirely on the firewall device 120 or a portion of it may reside on the firewall device 120 with the rest on a separate device. The host device 130 may contain a portion of the authentication logic 135h. The firewall device 120 may store therein keys, policies 275, data, etc., that are used in configuring communication connections (e.g., a connection via communication interface device 140). In this fashion, a connection may not be made by the communication interface device 140, unless the firewall device 120 is present and operational. Thus, if a user removes the firewall device 120, the user may not use the communication interface device 140 to connect to the network 210. However, the user may still be able to use the communication interface device 140 to connect to other networks that do not require the firewall device 120 to be in the system in order to establish a connection. Thus, for example, a corporation may be able to enforce a requirement that employees use the hardware firewall 125 when connecting to the corporate network 210. An authentication server 260 may be contacted in this process. In one embodiment, the Extensible Authentication Protocol is used to authenticate PPP connections between the host device 130 and a RADIUS server. This may be used for a variety of connections including, e.g., Ethernet, WLAN, modem, and Virtual Private Networks (VPN).

Additionally, the authentication may be tied to the CIC 145a. For example, the firewall device 120 may first perform a configuration integrity check. The firewall device 120 only passes the information needed for authentication (e.g., certificate) if the CIC check determines that the integrity is good.

The system 170 may also require the firewall device's 120 presence for O/S login. If someone pulls out the firewall device 120, they are automatically logged out. For example, if the CIC 145a or 145b determines that the firewall device 120 is pulled out, they are automatically logged out or cannot log in.

The system 170 may also comprise an alert log 297 for logging security alerts, which may be detected by the CIC 145a or by the firewall 125. The policies 275 may describe which events are to be logged. When such an event happens, an alert is created. If the host device 130 is connected to a policy server 160, then the alert may be sent to the policy server 160. Alerts may also be sent to other servers. Optionally, the alert may be stored even if it is transferred to a server 160. If no connection exists to an alerting system, then the alert is preferably stored. Then, the next time the firewall device 120 has access to an alerting service it may transfer the alert log to that server 160. In one embodiment, the data is sent LIFO so that the most recent alerts are received first. The policies 275 may also contain information that indicates whether an alert should be notified on the client 130. While a remote alert service is used in some embodiment, a remote alert service is not required.

The system 170 may also display the alerts to the host device user. Thus, one embodiment provides for a graphical user interface (GUI not shown), which is driven by the GUI interface layer 298.

In order to process network data with the hardware firewall 125, embodiments provide for various techniques with which to transfer or route the data to the firewall device 120. For example, the system is configured to cause data transferred by the communication interface device 140 to be processed by the firewall device 120. Some of the techniques are suitable for a wide variety of connection types (e.g., Ethernet, WLAN, VPN, modem, etc.). Others may be limited in the types of connections they support.

Figure 3A:
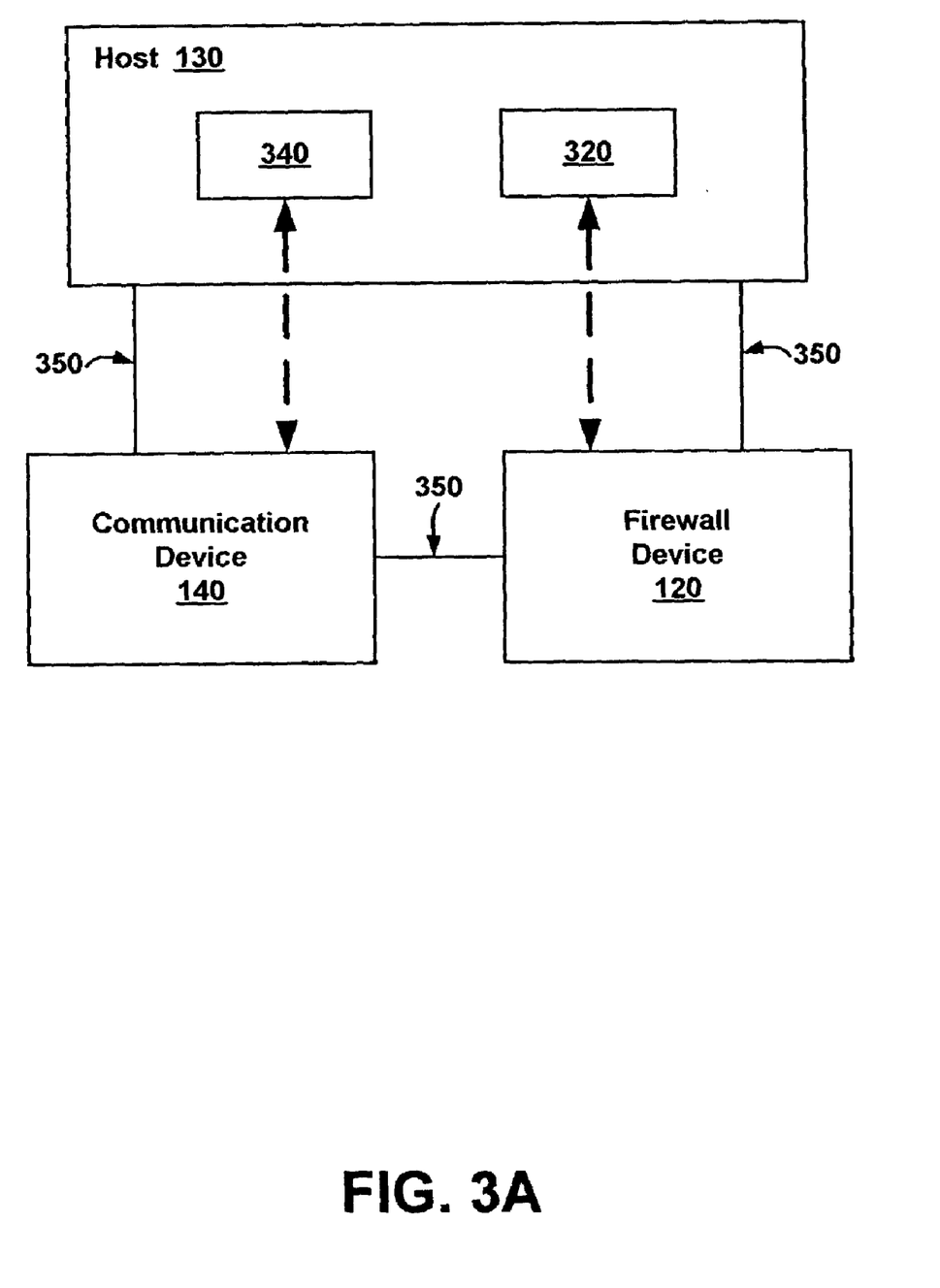
FIG. 3A and FIG. 3B are diagrams illustrating a resource allocation before and after a swap, according to embodiments of the present invention.
Figure 3B:
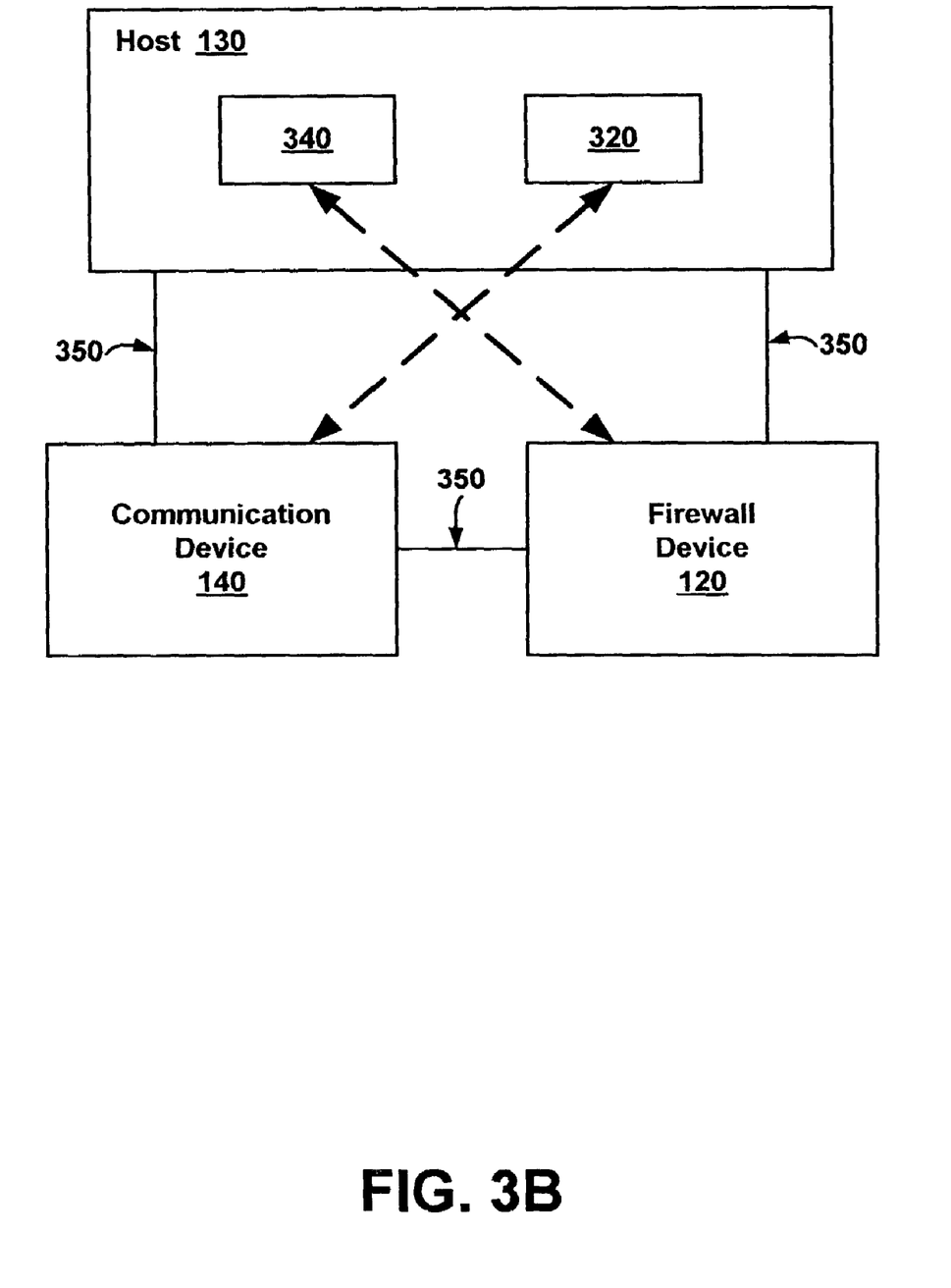

Referring now to FIG. 3A and FIG. 3B, one embodiment swaps host device 130 O/S resource spaces between the communication interface device 140 and the firewall device 120. Thus, in FIG. 3A, resources A 340 are originally assigned to the communication interface device 140 and resources B 320 are originally assigned to the firewall device 120. The dashed lines between the host device 130 and the devices 120, 140 indicate how the resources are allocated. The solid lines indicate connections 350 for actual data transfers. After swapping as shown in FIG. 3B, resources A 340 are now assigned to the firewall device 120 and resources B 320 are now assigned to the communication interface device 140.

In the present embodiment, the flow of data may be from the network 210 to the communication interface device 140 to the firewall device 120 to be processed with the hardware firewall 125. Then, the processed data may be transferred from the firewall device 120 to the host device 130. Because the resources of the communication interface device 140 and the firewall device 120 have been swapped, the host device 130 O/S believes the data came from the communication interface device 140. The swapping of the resources may be implemented via software.

FIG. 3A and FIG. 3B show a data transfer connection 350 between the firewall device 120 and the communication interface device 140 for transferring data between the devices 120, 140. This may be a physical link (e.g., PCMCIA, etc.), wireless, infra red, etc. Also shown are data transfer connections for transferring data between the devices 120, 140 and the host device 130. It will be understood that not all of the data transfer connections 350 shown may be needed to effect the necessary data transfers. The data may be transferred between the communication interface device 140 and the firewall device 120 in any suitable fashion. Because there may not be a standard for transferring data between the communication interface device 140 and the firewall device 120, a non-standard solution may be used.

Still referring to FIG. 3A and FIG. 3B, a reverse scenario is also possible for outbound data. When the client device 130 O/S has data to go onto the network 210 via the communication interface device 140, it transfers it to what it believes is the resource space of the communication interface device 140. However, because the resources spaces have been swapped, this is now the resource space for the firewall device 120. Thus, the firewall device 120 receives the data, processes it with the hardware firewall 125 and transfers it to the communication interface device 140.

Figure 4:
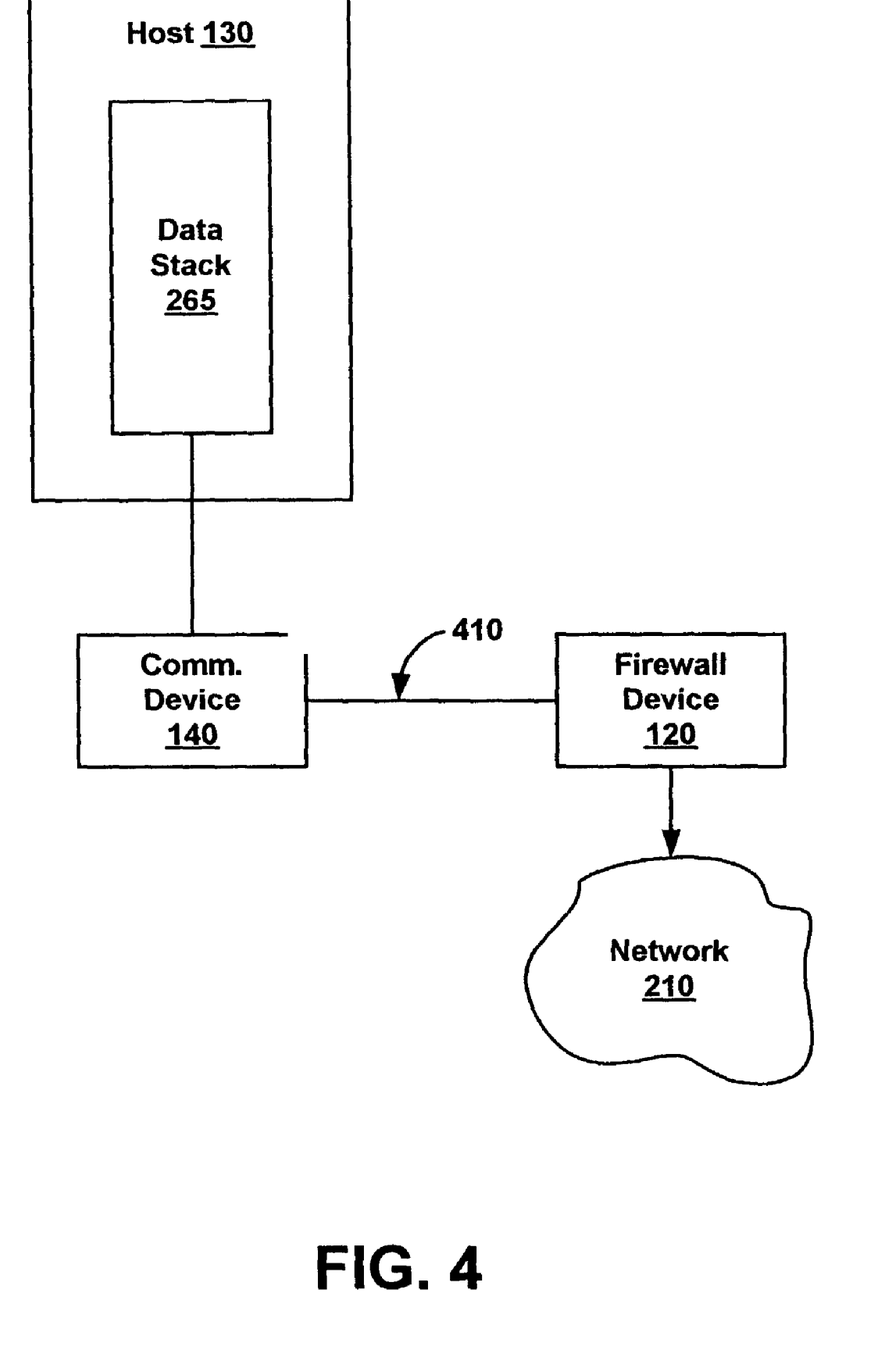
FIG. 4 is a diagram illustrating a device with an embedded firewall coupled to a device without such a firewall, according to embodiments of the present invention.

Referring now to FIG. 4, another embodiment for providing network data to the firewall device 120 is shown. Thus, another embodiment for causing data transferred by the communication interface device 140 to be processed by the firewall device 120 is shown. In this embodiment, a physical connection 410 is made between the communication interface device 140 and the firewall device 120. The firewall device 120 also has a physical connection to the network 210. The physical connection 410 between the two devices 120, 140 may be the same medium as the network connection. For example, if the communication interface device 140 is connecting to a LAN via an Ethernet cable, then such a cable may be used. However, the present embodiment is not limited to using an Ethernet cable.

It will be understood that the firewall device 120 may be coupled between the communication interface device 140 and the host device 130, as well. The location of the firewall device 120 may be selected to provide the protection desired. Thus, in this embodiment, all data that is processed by the communication interface device 140 is also available to the firewall device 120 for processing. Furthermore, received data may be processed by the firewall 125 before it enters the host device 130 and sent data may be processed by the firewall 125 after it leaves the host device 130.

Figure 5:
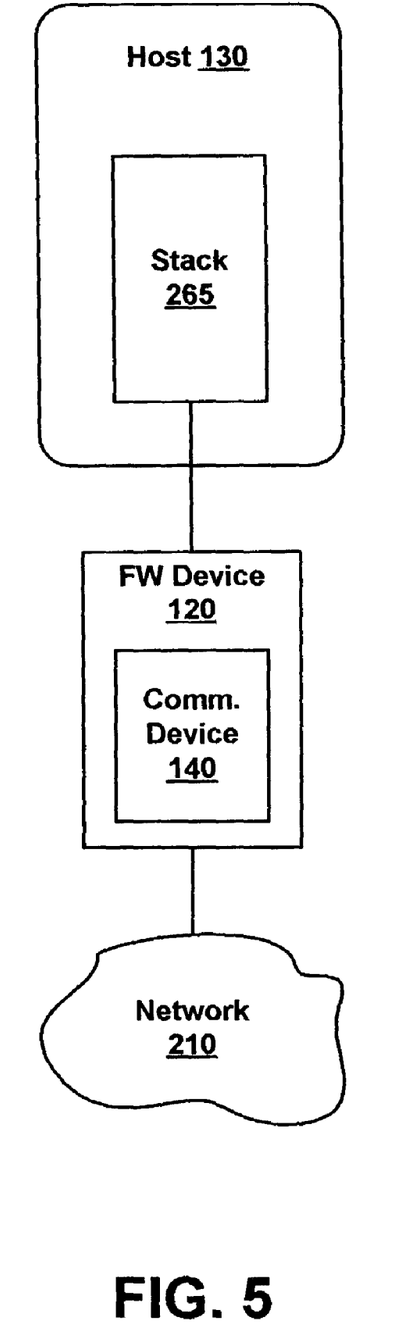
FIG. 5 is a diagram illustrating a device with an embedded firewall coupled to a device without one, according to embodiments of the present invention.

Another embodiment for providing network data to the firewall device 120 (e.g., causing data transferred by the communication interface device 140 to be processed by the firewall device 120) is shown in FIG. 5. In this embodiment, the firewall device 120 and the communication interface device 140 are coupled together by, for example, an MPCI adapter (Mini Peripheral Component Interconnect). Thus, the firewall device 120 may be plugged into the top of the communication interface device 140.

Alternatively, the firewall device 120 may be slid into the top of the communication interface device 140. As shown, the firewall device 120 is physically connected to the network 210. However, the communication interface device 140 could be physically connected to the network 210 instead, with the firewall device 120 receiving the network data from the communication interface device 140.

Figure 6:
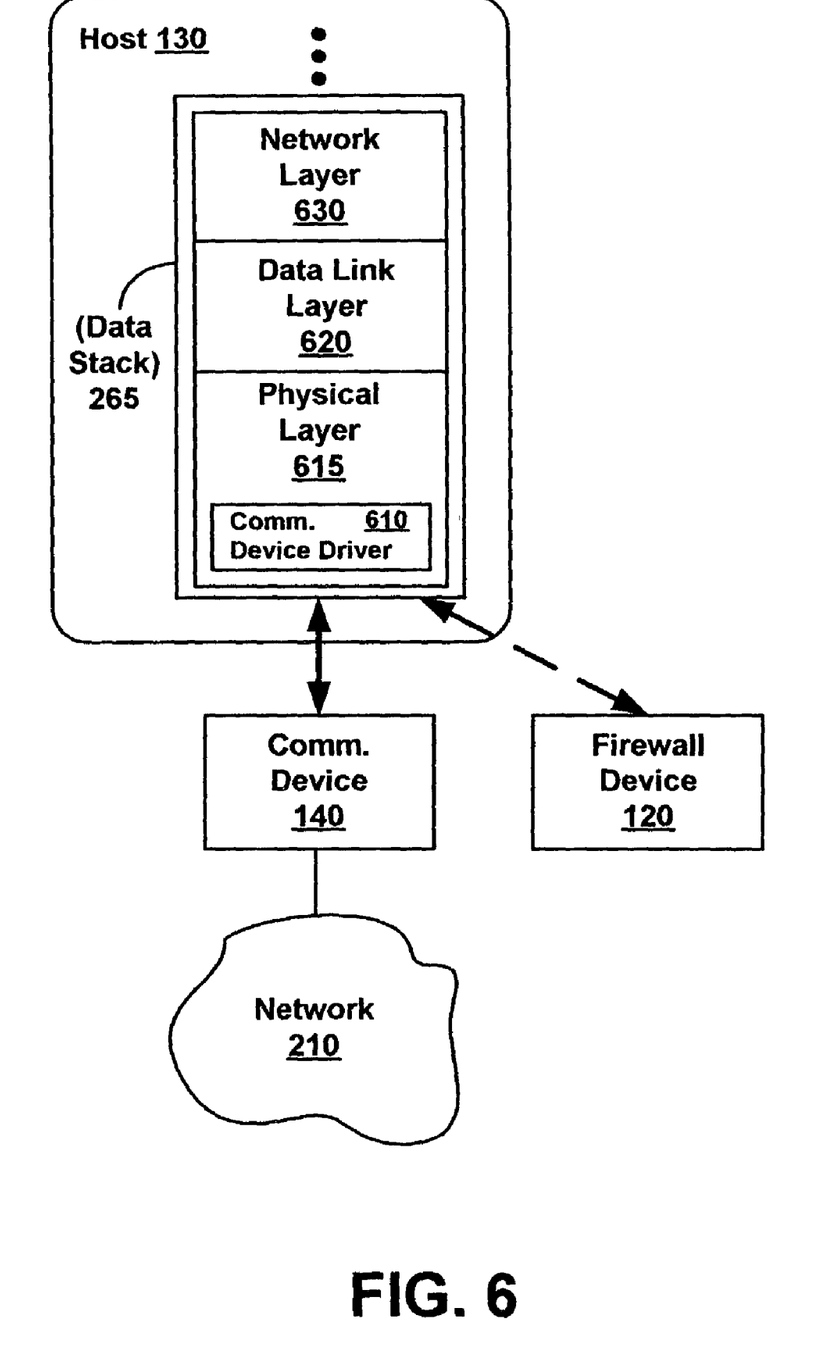
FIG. 6 is a diagram of a network stack with a driver for routing data to an embedded firewall to provide the same for a device without one, according to embodiments of the present invention.

Another embodiment for providing network data to the firewall device 120 (e.g., causing data transferred by the communication interface device 140 to be processed by the firewall device 120) is shown in FIG. 6. In this embodiment, a driver 610 for the communication interface device 140 has properties which allow it to transfer or route the data to the firewall device 120. The present embodiment may be suitable for a wide variety of connection types. The communication interface device driver 610, which may be at the physical layer 615, is aware of the firewall device 120. Thus, data received from the network 210 goes from the communication interface device 140 to the communication interface device driver 610 to the firewall device 120. Arrows between the devices 120, 140 and the communication interface device driver 610 show logical transfers. It will be understood that the data may pass through additional components, such as, for example, a firewall device driver 280. After the firewall device 120 uses the hardware firewall 125 to process the data, it may send it back to the communication interface device driver 610 for it to transfer up the data stack 265, a portion of which is shown in FIG. 6. For example, the data may go though the data link layer 620 and the network layer 630.

Still referring to FIG. 6, a reverse scenario is also possible. For example, data to be transferred out of the network 210 is first received by the communication interface device driver 610 and then transferred to the firewall device 120. After receiving the data back from the firewall device 120, the communication interface device driver 610 passes it down to the communication interface device 140. In this fashion, all network data involving the communication interface device 140 is processed by the hardware firewall 125 in the firewall device 120.

Still referring to FIG. 6, the communication interface device driver 610 may be designed to function with or without the firewall device 120. If the user attempts to connect to the network 210, embodiments require the presence of the firewall device 120 to access the network 210. Thus, the communication interface device driver 610 looks for the firewall device 120. If, however the user is connecting to a network that does not require the presence of the firewall device 120, then the communication interface device driver 610 does not look for the firewall device 120 and functions as a driver for only the communication interface device 140 would.

Figure 7:
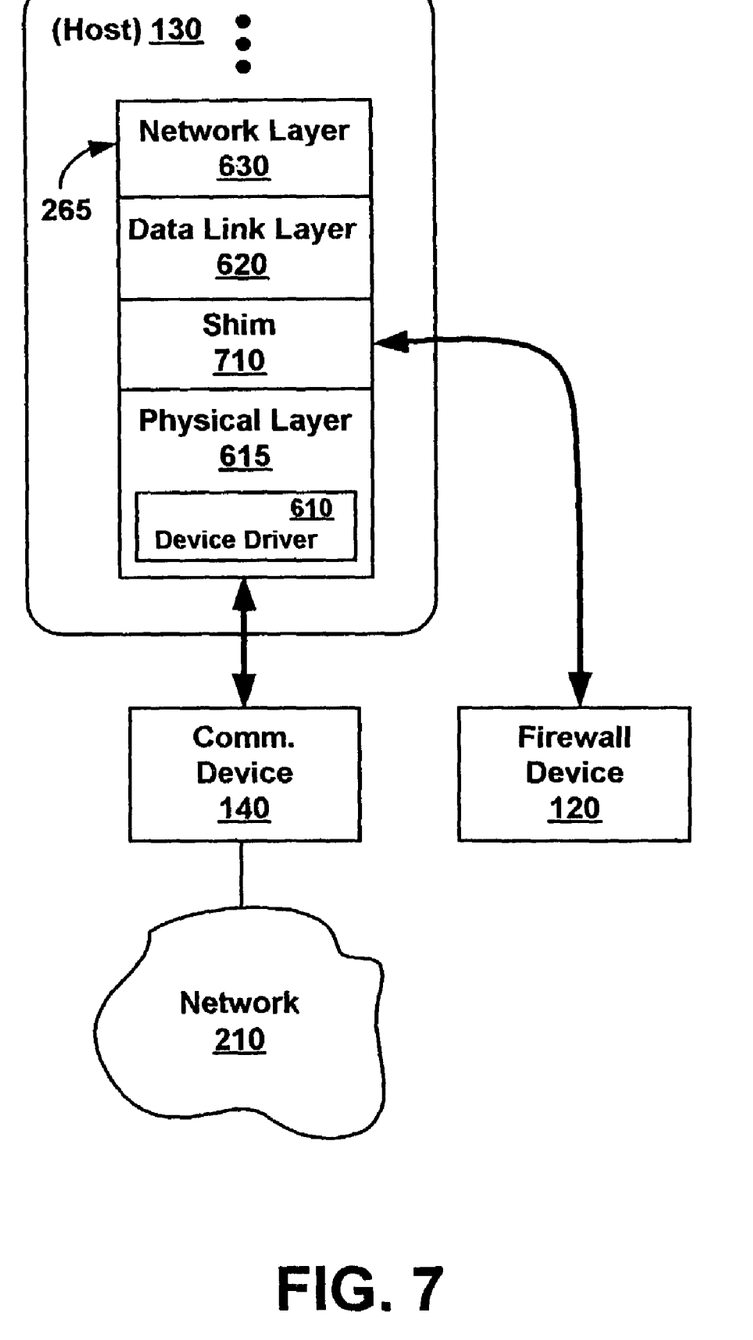
FIG. 7 is a diagram of a shim above a driver for routing data to an embedded firewall to provide the same for a device without one, according to embodiments of the present invention.

Referring now to FIG. 7, yet another embodiment for providing network data to the firewall device 120 (e.g., causing data transferred by the communication interface device 140 to be processed by the firewall device 120) is shown. In this embodiment, a shim 710 is provided above the communication interface device driver 610. Thus, the original communication interface device driver 610 need not be replaced in this embodiment. The shim 710 may transfer data received from the communication interface device driver 610 to the firewall device 120 for firewall 125 processing. And the firewall device 120 may transfer processed data back to the shim 710 to be sent up the stack 265. The process may be reversed for data being sent out to the network 210. The arrow between the firewall device 120 and the shim 710 and the arrow between the communication interface device driver 610 and the communication device 140 illustrate logical transfers. In one embodiment, the shim 710 resides above a miniport driver in the data stack 265.

Figure 8:
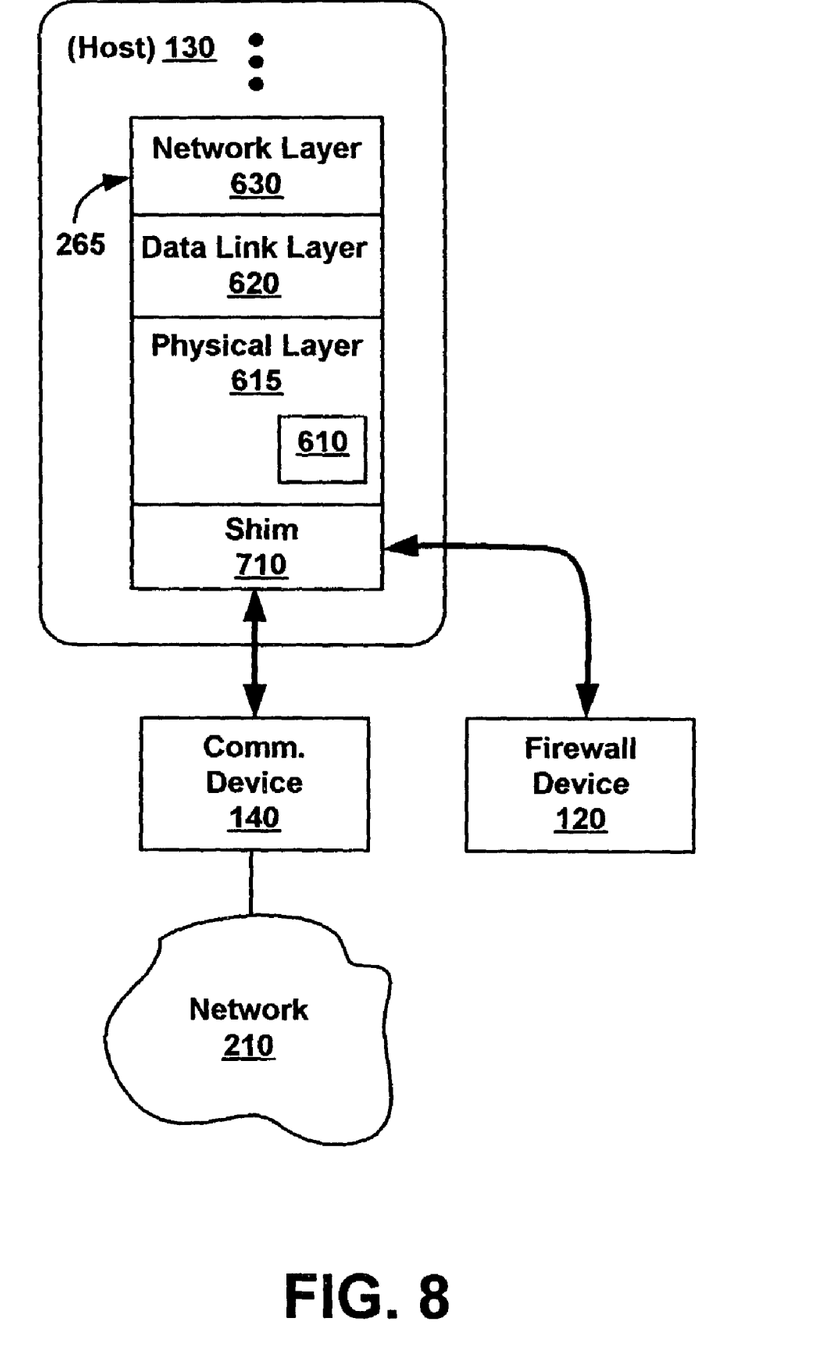
FIG. 8 is a diagram of a shim below a driver for routing data to an embedded firewall to provide the same for a device without one, according to embodiments of the present invention.

Referring now to FIG. 8, yet another embodiment for providing network data to the firewall device 120 (e.g., causing data transferred by the communication interface device 140 to be processed by the firewall device 120) is shown. In this embodiment, a shim 710 is provided below the communication interface device driver 610. Data may be transferred between the shim 710 and the firewall device 120 to allow firewall 125 processing of all network data for the connection used by the communication interface device 140. In this embodiment, the shim 710 talks directly to the hardware, therefore the shim 710 must know how to talk to the particular communication interface device 140 being used. The arrows between the firewall device 120 and the communication interface device driver 610 and the shim 710 illustrate logical transfers.

An embodiment provides for a method of configuring a firewall device 120 for operation in a network 210. Referring now to Process 900 of FIG. 9, in step 910, a configuration integrity check of a software component (e.g., firewall device driver 280, communication interface device driver 610, shim 710) is performed. For example, a cryptographic hash is performed on the software component to produce a hash value. The hash value may be compared to a hash value stored on the firewall device 120 to determine whether the software component has been compromised. Step 910 may be repeated at any time to assure that the configuration remains valid and that software components have not been tampered with.

Figure 9:
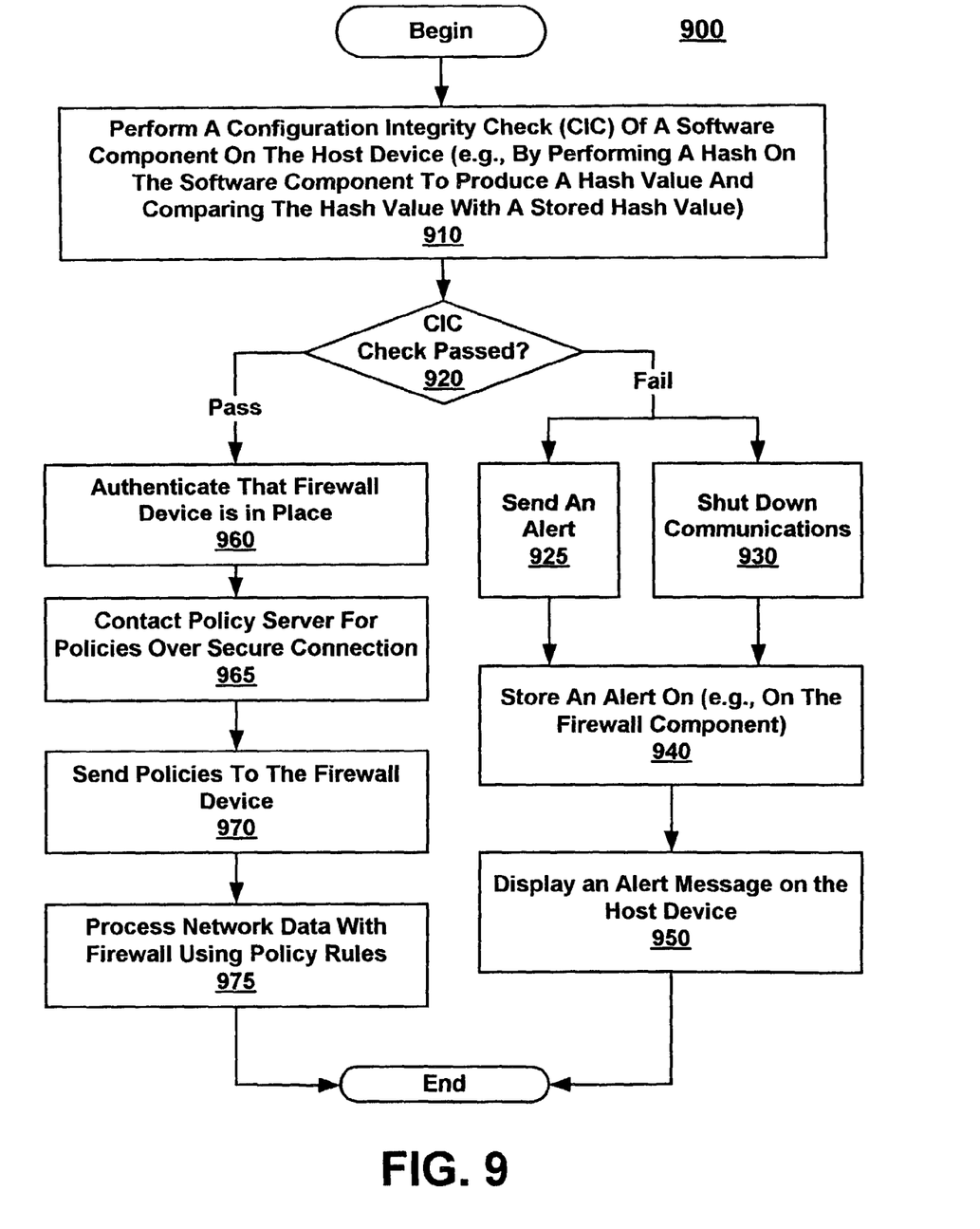
FIG. 9 is a flowchart illustrating steps of a process of configuring a firewall device for operation, according to embodiments of the present invention.

Step 920 represents a branch depending on the result of the configuration integrity test. If the configuration integrity check fails, an alert may be sent in step 925. For example, the firewall device 120 sends an alert to a policy server 160. However, the alert may be sent to any other server. Furthermore, the alert need not be sent. Alternatively, step 930 is taken instead, in which external communication is either shut down or prevented from being established by the host device 130.

In step 940, the alert may be stored on the firewall device 120. This may be the case whether the alert was sent to a server or not.

In step 950, an alert may be displayed to the user of the host device 130 via the GUI interface layer 298 causing an alert to be displayed on the host device 130. For example, a message may be displayed on a computer screen (not shown). Alternatively, a visual or audio warning signal may be triggered. For example, an LED may be lit.

If the configuration integrity test passes, then in step 960 a secure connection to the network 210 is established provided the firewall device 120 is coupled to the host device 130. For example, the host device 130 requests authentication information from the firewall device 120. If the firewall device 120 is not coupled to the host 130, the connection to the network 210 cannot be established as the needed connection authentication information is securely stored on firewall device 120.

In step 965, after a secure connection has been established, the firewall device 120 contacts the policy server 160 for policies 275. Alternatively, the firewall device 120 uses policies 275 that it has stored. For example, the policy server 160 may not be visible, in which case stored policies are relied on.

In step 970, the policy server 160 sends the policies 275 to the firewall device 120, which updates its stored policies 275. The firewall device 120 is now configured with the policies 275 to be used by the firewall 125 and the software components have checked out as being un-compromised.

In step 975, network data is checked against the policy rules and actions specified by the policies are performed. For example, data that is received by the communication device 140 is routed to the firewall device 120, according to any of the embodiments discussed herein. The Process 900 may then perform a configuration integrity check again.

Based on the outcome of checking the data against the policy rules and the configuration integrity check, steps 925-950 may be taken, in which security and/or configuration alerts are sent and/or stored and communication via the network 210 may be shut down. Process 900 may continue until communication is shut down or the network connection is otherwise terminated.

Figure 10:
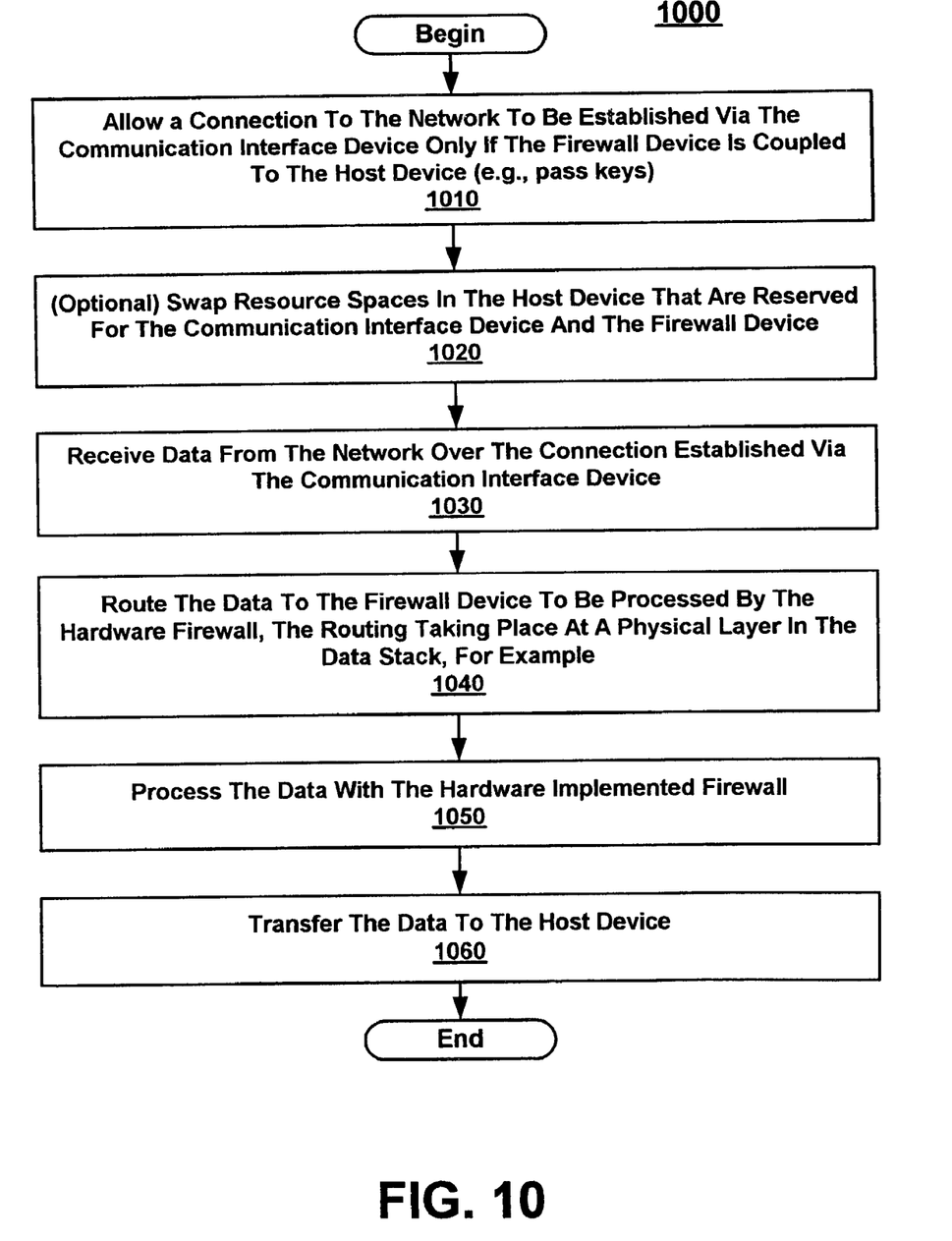
FIG. 10 is a flowchart illustrating steps of a process of providing network security by adding an embedded firewall, according to embodiments of the present invention.

Process 1000 of FIG. 10 illustrates one of the embodiments to provide a hardware implemented firewall 135 to a communication device 140 without such a firewall 135. Process 1000 may be a subset of Process 900 of FIG. 9. For example, Process 1000 may be substituted for steps 960-975 of Process 900. In step 1010, a connection to a network 210 is allowed to be established when using a communication interface device 140 only if a firewall device 120 comprising a hardware implemented firewall 125 is coupled to a host device 130. For example, the host device 130 requests connection configuration information from the firewall device 120. If the firewall device 120 is not coupled to the host 130, the connection to the network 210 cannot be established as the needed connection authentication information is securely stored on firewall device 120. The firewall device 120 may condition this transfer on the passing of a configuration integrity check, as in process 900 of FIG. 9. The policies 275 that the firewall device 120 has stored thereon may also be used to determine whether the configuration information will be transferred to the host device 130.

In optional step 1020, resource spaces (320, 340) that are reserved for the communication interface device 140 and the firewall device 120 are swapped in the host device 130. Therefore, the host device 130 treats the communication interface device 140 as the firewall device 120 and vice versa.

In step 1030 data is received from the network 210 over the connection established via the communication interface device 140.

In step 1040, the data is routed or transferred to the firewall device 120 to be processed by the hardware implemented firewall 125. The routing may take place at a physical layer 615 of the host device stack 265 (e.g., by a communication interface device driver 610). However, the present invention is not limited to this method of transferring data to the firewall device 120. In other embodiments, the data is transferred to the firewall device 120 by a direct connection to the communication device 140 or by routing from a shim 710 in the data stack 265. If step 1030 is taken, step 1040 may comprise a transfer from the communication interface device 140 to the firewall device 120.

In step 1050, the firewall device 120 processes the data with the hardware implemented firewall 125.

In step 1060, the data is transferred from the firewall device 120 to the host device 130. The host device 130 may then transfer the data up the data stack 265. Process 1000 then ends. The data may be transferred from the firewall device 120 to the host device 130 by various techniques described herein. For example, the techniques described in conjunction with FIG. 3A-FIG. 8 may be used. However, the present invention is not limited to these techniques.

It will be understood that Process 1000 of FIG. 10 may be modified for data transfers going out to the network 210. For example, the data may be routed or transferred to the firewall device 120 before processing by the hardware implemented firewall 125, as discussed in conjunction with FIG. 3A though FIG. 8.

Therefore, it will be seen that embodiments of the present invention provide for a system, method, and device for preventing unauthorized access to a network. Embodiments provide protection for a network that has devices making remote connections. Embodiments provide protection that is not easily defeated by hacking techniques such as Trojan programs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of providing security in a network having a network interface device that makes a network connection without a firewall capability in said network interface device that is required by the network for data transfer between the network and a host device using the network interface device, said method comprising:
   a) allowing, by said network, a connection to said network to be established when the host device uses said network interface device without the required firewall capability only if a firewall device comprising a hardware implemented firewall is coupled to said host device and a configuration integrity check of a software component on said host device passes;
   b) receiving data from said network over said connection establish via said network interface device;
   c) processing said data with said hardware implemented firewall; and
   d) transferring said processed data to said host device;
      wherein, performing said configuration integrity check by performing a hash on said software component to produce a hash value and comparing said hash value with a stored hash value,
      wherein, said stored hash value resides on said firewall device.

2. The method of claim 1 further comprising:
   e) swapping resource spaces in said host device that are reserved for said network interface device and said firewall device, wherein said host device treats said network interface device as said firewall device and vice versa; and
   f) said network interface device transferring data received from said network in b) to said firewall device, wherein said firewall device processes said data with said hardware implemented firewall.

3. The method of claim 1, further comprising:
   e) transferring data to be transferred over said network by said network interface device to said firewall device; and
   f) processing said data with said hardware implemented firewall, wherein said data is processed by said hardware implemented firewall before it is transferred over said network connection established via said network interface device.

4. The method of claim 3, wherein said
   e) comprises said host device routing said data to said firewall device before it is sent to said network interface device, said routing taking place at a physical layer in said data stack.

5. The method of claim 1
   wherein a) further comprises sending policies to said firewall device, wherein the operation of said hardware implemented firewall is modified.

6. A method of providing security in a network having a network interface device that makes a network connection without a firewall capability in said network interface device that is required by the network for data transfer between the network and a host device using the network interface device, said method comprising:
   allowing, by a network, a connection to said network to be established when said host device uses said network interface device without the required firewall capability only if a firewall device comprising a hardware implemented firewall is coupled to said host device and a configuration integrity check of a software component on said host device passes;
   receiving data from said network over said connection established via said network interface device;
   processing said data with said hardware implemented firewall; and
   transferring said processed data to said host device;
   a wherein the configuration integrity check of the software component on said host device comprises performing a hash on said software component to produce a hash value and comparing said hash value with a stored hash value.

7. The method of claim 6, further comprising said host device routing said data to said firewall device to be processed by said hardware implemented firewall, said routing taking place at a physical layer in said data stack.

8. The method of claim 6, further comprising:
   sending policies to said firewall device, wherein the operation of said hardware implemented firewall is modified.

9. The method of claim 6, wherein said stored hash value resides on said firewall device.

10. The method of claim 6, further comprising:
    sending an alert if said configuration integrity check fails.

11. The method of claim 10, further comprising:
    storing an alert if said configuration integrity check fails.

12. The method of claim 6, further comprising:
    swapping resource spaces in said host device that are reserved for said network interface device and said firewall device, wherein said host device treats said network interface device as said firewall device and vice versa; and
    said network interface device transferring data received from said network to said firewall device, wherein said firewall device processes said data with said hardware implemented firewall.

13. The method of claim 6, further comprising:
    transferring data to be transferred over said network by said network interface device to said firewall device; and
    g) processing said data with said hardware implemented firewall, wherein said data is processed by said hardware implemented firewall before it is transferred over said network connection established via said network interface device.

14. The method of claim 13, wherein said transferring data to be transferred over said network by said network interface device to said firewall device comprises:
    routing said data from said host device to said firewall device before it is sent to said network interface device, said routing taking place at a physical layer in said data stack.

* * * * *